(12) United States Patent
Cho (10) Patent No.: US 8,344,751 B2
(45) Date of Patent: Jan. 1, 2013

(54) IMPEDANCE CODE GENERATION CIRCUIT, SEMICONDUCTOR DEVICE INCLUDING THE SAME, AND METHOD FOR SETTING TERMINATION IMPEDANCE

(75) Inventor: Jin-Hee Cho, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 0 days.

(21) Appl. No.: 12/960,899

(22) Filed: Dec. 6, 2010

(65) Prior Publication Data

US 2011/0291699 A1  Dec. 1, 2011

(30) Foreign Application Priority Data

May 25, 2010 (KR) .................. 10-2010-0048428

(51) Int. Cl.
*H03K 17/16* (2006.01)
(52) U.S. Cl. ........................................................ 326/30
(58) Field of Classification Search .................. None
See application file for complete search history.

(56) References Cited

U.S. PATENT DOCUMENTS

| 7,038,486 | B2 * | 5/2006 | Aoyama et al. ................. 326/30 |
| 7,535,251 | B2 * | 5/2009 | Morishima et al. ............. 326/30 |
| 7,656,186 | B2 * | 2/2010 | Osanai et al. ................... 326/30 |
| 7,893,710 | B2 * | 2/2011 | Lee ................................. 326/30 |
| 8,036,846 | B1 * | 10/2011 | Vullaganti .................... 702/104 |
| 2002/0153456 | A1 * | 10/2002 | Yerge ........................ 246/34 CT |
| 2008/0211534 | A1 * | 9/2008 | Jeong et al. ..................... 326/30 |

FOREIGN PATENT DOCUMENTS

KR   100575006   4/2006

\* cited by examiner

*Primary Examiner* — Shawki S Ismail
*Assistant Examiner* — Crystal L Hammond
(74) *Attorney, Agent, or Firm* — IP & T Group LLP (57) ABSTRACT

An impedance code generation circuit includes a first code generation unit configured to compare a voltage of a calibration node with a reference voltage and generate a first impedance code, a code modification unit configured to generate a modified impedance code by performing an operation on the first impedance code according to a setting value, and a second code generation unit configured to generate a second impedance code based on the modified impedance code.

8 Claims, 7 Drawing Sheets

IMPEDANCE CODE GENERATION CIRCUIT, SEMICONDUCTOR DEVICE INCLUDING THE SAME, AND METHOD FOR SETTING TERMINATION IMPEDANCE

CROSS-REFERENCE TO RELATED APPLICATIONS

The present application claims priority of Korean Patent Application No. 10-2010-0048428, filed on May 25, 2010, which is incorporated herein by reference in its entirety.

BACKGROUND OF THE INVENTION

Exemplary embodiments of the present invention relate to an impedance code generation circuit which generates an impedance code for impedance matching.

A variety of semiconductor devices are implemented with integrated circuit chips. Such semiconductor devices are incorporated into a variety of electrical products, such as personal computers, servers, and workstations. In most cases, semiconductor devices include reception circuits configured to receive a variety of external signals through input pads, and output circuits configured to provide a variety of internal signals through output pads to external circuits.

As the operating speeds of electrical products increase, swing widths of signals transferred between semiconductor devices are gradually reduced in order to minimize delay time necessary for signal transfer. However, as the swing widths of the signals are reduced, influence of external noises is increased, and signal reflection at interface terminals due to impedance mismatching becomes more severe. The impedance mismatching is generally caused by external noises or variations in power supply voltage, operating temperature, or fabrication processes. The impedance mismatching may make it difficult to transfer data at high speed and may distort output data outputted from data output terminals of the semiconductor device. Therefore, where the reception circuit of the semiconductor device receives the distorted output signals through the input terminals, setup/hold fail or incorrect determination of input levels may occur frequently.

In order to address the above concerns, memory devices requiring high-speed operations have adopted impedance matching circuits, called on-die termination (ODT) devices, in the vicinity of pads inside integrated circuit chips. In a typical ODT scheme, a source termination is performed at a transmission side by an output circuit, and a parallel termination is performed at a reception side by a termination circuit, which is coupled in parallel to the reception circuit which is coupled to an input pad.

A ZQ calibration refers to a procedure of generating impedance codes which change according to variations of process, voltage, and temperature (PVT) conditions. A termination impedance value is adjusted using impedance codes generated as a result of ZQ calibration. Generally, a pad to which an external resistor serving as a calibration reference is coupled is referred to as a ZQ pad. For this reason, the term "ZQ calibration" is widely used.

An impedance code generation circuit for generating an impedance code, and a termination circuit for terminating an input/output node by using the generated impedance code is described below.

Figure 1:
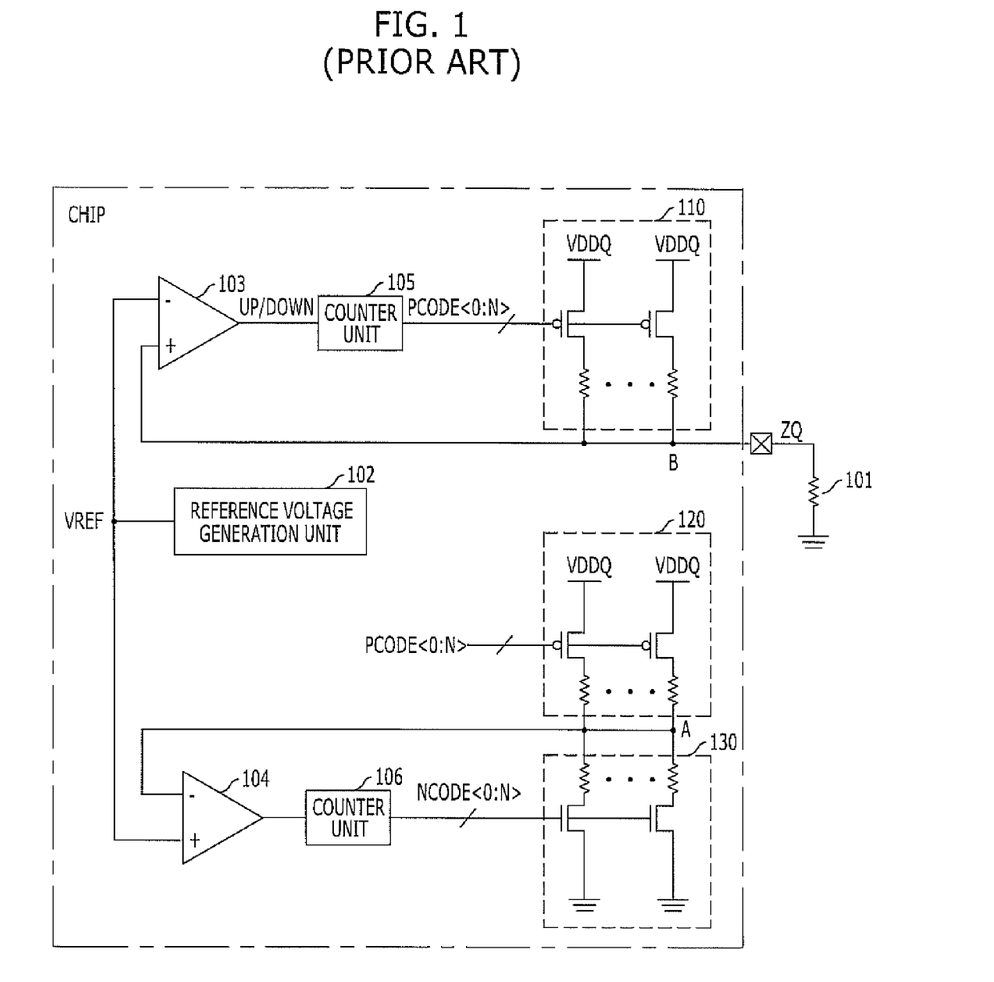
FIG. 1 is a diagram of a conventional impedance code generation circuit.

FIG. 1 is a diagram of a conventional impedance code generation circuit.

Referring to FIG. 1, a conventional calibration circuit includes a pull-up reference impedance unit 110, a dummy reference impedance unit 120, a pull-down reference impedance unit 130, a reference voltage generation unit 102, comparison units 103 and 104, and counter units 105 and 106.

Upon operation of the conventional calibration circuit, the comparison unit 103 compares a voltage of a calibration node B with a reference voltage VREF. The calibration node has a voltage that is generated by voltage division between an external resistor 101 (hereinafter, assumed as 120Ω), which is connected to a calibration pad ZQ, and the pull-up reference impedance unit 110. Meanwhile, the reference voltage VREF (generally, ½*VDDQ) is generated from the reference voltage generating unit 102. As a result of the comparison, the comparison unit 103 generates an up/down signal UP/DOWN.

The counter unit 105 receives the up/down signal UP/DOWN to generate a pull-up impedance code PCODE<0:N>. The generated pull-up impedance code PCODE<0:N> adjusts the total impedance value of the pull-up impedance unit 110 by turning on/off parallel resistors inside the pull-up reference impedance unit 110 (impedance values of the parallel resistors are designed according to binary weights). The adjusted total impedance value of the pull-up reference impedance unit 110 again influences the voltage of the calibration node B, and the above-described operations are repeated. Consequently, the pull-up impedance code PCODE<0:N> is counted until the total impedance value of the pull-up reference impedance unit 110 is equal to the impedance value of the external resistor 101. This operation is referred to as a pull-up calibration operation.

The pull-up impedance code PCODE<0:N> generated by the above-described pull-up calibration operation is inputted to the dummy reference impedance unit 120 and used to determine a total impedance value of the dummy reference impedance unit 120. Subsequently, a pull-down calibration operation is performed. In a manner similar to the pull-up calibration operation, the pull-down calibration operation is performed using the comparison unit 104 and the counter unit 106, so that a voltage of a node A becomes equal to the reference voltage VREF, that is, the total impedance value of the pull-down reference impedance unit 130 becomes equal to the total impedance value of the dummy reference impedance unit 120. This operation is referred to as a pull-down calibration.

The impedance codes PCODE<0:N> and NCODE<0:N> generated as the result of the above-described ZQ calibration operation are inputted to a termination circuit (see FIG. 2) to adjust a termination impedance value.

Figure 2:
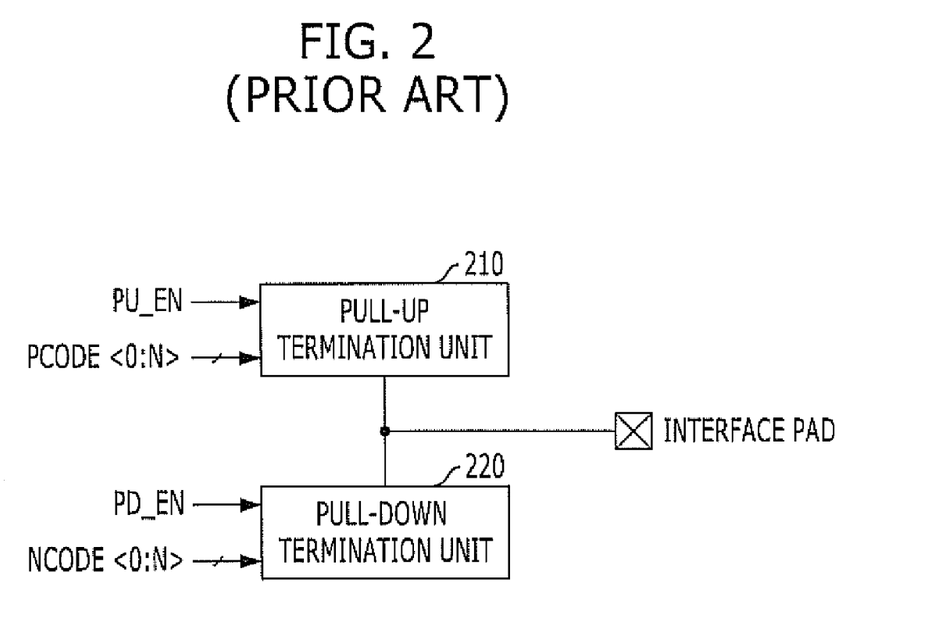
FIG. 2 is a diagram of a conventional termination circuit.

FIG. 2 is a diagram of a conventional termination circuit.

The termination circuit refers to a circuit which receives the impedance codes PCODE<0:N> and NCODE<0:N> generated from the impedance code generation circuit of FIG. 1 and terminates an interface pad.

The termination circuit includes a pull-up termination unit 210 and a pull-down termination unit 220. The termination circuit may be configured with either the pull-up termination unit 210 or the pull-down termination unit 220 according to the termination scheme.

The pull-up termination unit 210 is designed to have a similar configuration as the pull-up reference impedance unit 110 (see FIG. 1), and receives the pull-up impedance code PCODE<0:N>. Therefore, the pull-up termination unit 210 may have the same impedance value as the pull-up reference impedance unit 110. Although the pull-up termination unit 210 may have the same impedance value (e.g., 240Ω) as the pull-up reference impedance unit 110, it may also be adjusted to have other impedances (e.g., 120Ω or 60Ω) by scaling. A pull-up termination enable signal PU_EN is a signal which turns on/off the pull-up termination unit 210. That is, the turning on/off of the pull-up termination unit 210 is determined by the pull-up termination enable signal PU_EN. The impedance value of the turned-on pull-up termination unit 210 is determined by the pull-up impedance code PCODE<0:N>, The pull-down termination unit 220 is designed to have a similar configuration as the pull-down reference impedance unit 130 (see FIG. 1), and receives the pull-down impedance code NCODE<0:N>. Therefore, the pull-down termination unit 220 may have the same impedance value as the pull-down reference impedance unit 130. Although the pull-down termination unit 220 may have the same impedance value (e.g., 240Ω) as the pull-down reference impedance unit 130, it may also be adjusted to have other impedances (e.g., 120Ω or 60Ω) by scaling. A pull-down termination enable signal PD_EN is a signal which turns on/off the pull-down termination unit 220. That is, the turning on/off of the pull-down termination unit 220 is determined by the pull-down termination enable signal PD_EN. The impedance value of the turned-on pull-down termination unit 220 is determined by the pull-down impedance code NCODE<0:N>.

The termination circuit may be used as a main driver of an output driver which outputs data. When the pull-up termination enable signal PU_EN is activated, the pull-up termination unit 210 pull-up terminates the interface pad (e.g., a DQ pad) and outputs "high" data through the interface pad. When the pull-down termination enable signal PD_EN is activated, the pull-down termination impedance unit 220 pull-down terminates the interface pad and outputs "low" data through the interface pad.

As a result of the calibration operation of the impedance code generation circuit of FIG. 1, the impedance codes PCODE<0:N> and NCODE<0:N> are generated and inputted to the termination circuit of FIG. 2. The termination circuit of FIG. 2 attempts to obtain a target impedance value, which matches an impedance of the external circuit. However, the impedance value of the termination circuit of FIG. 2 may become greater than or less than the target impedance value.

This occurs when the impedance codes PCODE<0:N> and NCODE<0:N> are incorrectly generated by an error of the impedance code generation circuit of FIG. 1, or when a layout difference occurs between the termination unit of the termination circuit and the reference impedance unit of the impedance code generation circuit even though the impedance codes PCODE<0:N> and NCODE<0:N> are correctly generated. Since such occurrences cannot be entirely eliminated, there is a need for a method which can adjust an impedance code value or an impedance value of a termination circuit.

SUMMARY OF THE INVENTION

Exemplary embodiments of the present invention are directed to a circuit and method which can determine an exact setting value for adjusting an impedance value to correct an impedance value.

In accordance with an exemplary embodiment of the present invention, an impedance code generation circuit includes a first code generation unit configured to compare a voltage of a calibration node with a reference voltage and generate a first impedance code, a code modification unit configured to generate a modified impedance code by performing an operation on the first impedance code according to a setting value, and a second code generation unit configured to generate a second impedance code based on the modified impedance code.

The first code generation unit may be a pull-up code generation unit, the first impedance code may be a first pull-up impedance code, the modified impedance code may be a second pull-up impedance code, the second code generation unit may be a pull-down code generation unit, and the second impedance code may be a pull-down impedance code.

The code modification unit may generate the second pull-up impedance code by adding or subtracting the setting value to or from the first pull-up impedance code. The code modification unit may include at least one fuse circuit configured to store the setting value, and a subtraction/addition circuit configured to add or subtract the setting value to or from the first pull-up impedance code.

The fuse circuit may output the setting value according to whether the fuse is cut or not when a test mode signal is activated, and the fuse circuit may output the setting value according to an externally inputted signal when the test mode signal is deactivated.

In accordance with another exemplary embodiment of the present invention, a semiconductor device includes an impedance code generation circuit configured to generate an impedance code, a code modification unit configured to generate a modified impedance code by performing an operation on the impedance code according to a setting value, and a termination circuit configured to terminate an interface node by using an impedance value determined by the modified impedance code.

In accordance with yet another exemplary embodiment of the present invention, a method for setting a termination impedance value of a semiconductor device includes enabling an impedance code generation circuit to generate an impedance code for setting an impedance value, terminating an interface node by using an impedance value determined by the impedance code, determining whether an impedance is matched or not by measuring the characteristic of the interface node, inputting a setting value to a semiconductor device, based on the measurement, generating a modified impedance code by performing an operation on the impedance code according to the setting value, terminating the interface node by using an impedance value determined by the modified impedance code, determining whether the impedance is matched or not by the characteristic of the interface node, and programming a fuse circuit for storing the setting value, based on the determination.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
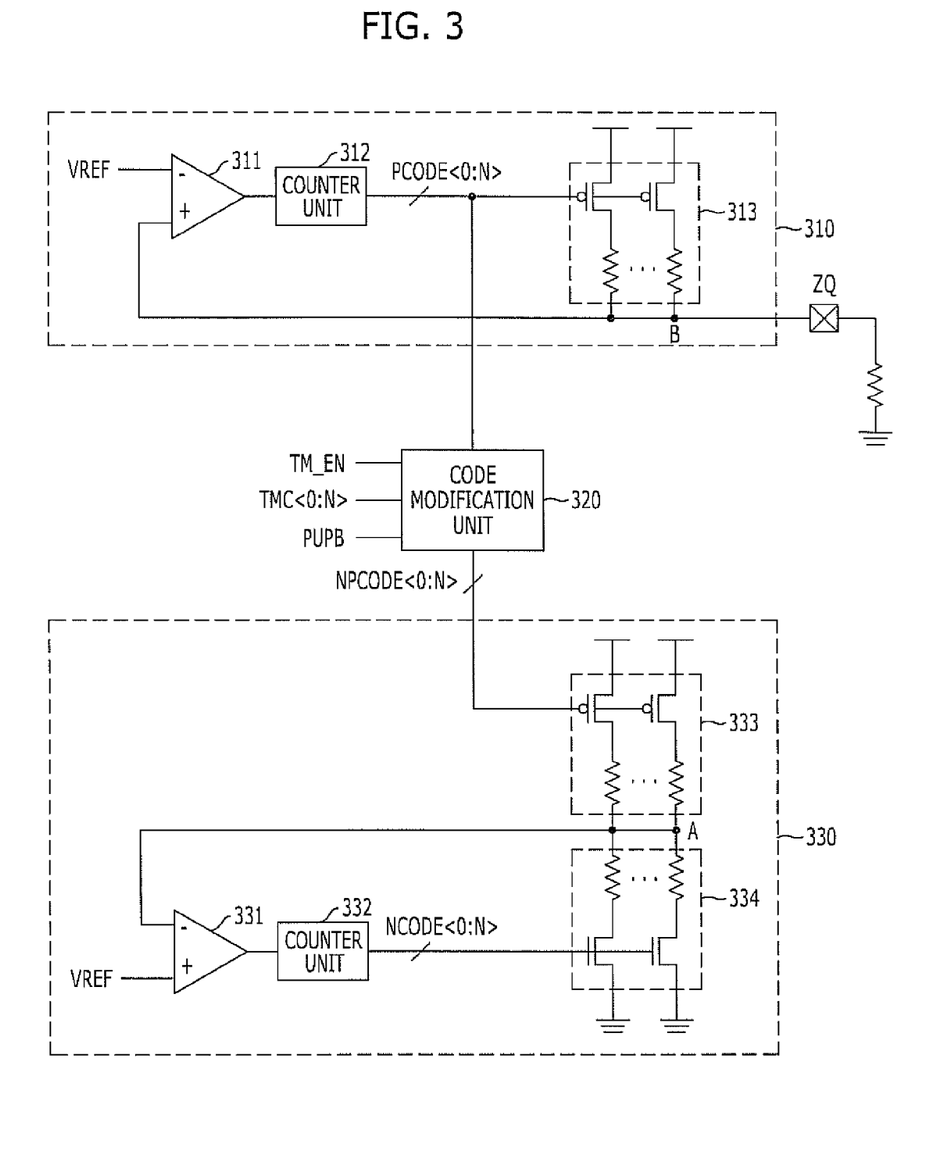
FIG. 3 is a diagram of an impedance code generation circuit in accordance with an exemplary embodiment of the present invention.

FIG. 3 is a diagram of an impedance code generation circuit in accordance with an exemplary embodiment of the present invention.

Referring to FIG. 3, the impedance code generation circuit includes a pull-up code generation unit 310, a code modification unit 320, and a pull-down code generation unit 330. The pull-up code generation unit 310 is configured to compare a voltage of a calibration to node B with a reference voltage VREF and generate a first pull-up impedance code PCODE<0:N>. The code modification unit 320 is configured to generate a second pull-up impedance code NPCODE<0:N> by performing an operation on the first pull-up impedance code PCODE<0:N> in response to externally inputted information (e.g., TMC<0:N>, TM_EN, and PUPB). The pull-down code generation unit 330 is configured to generate a pull-down impedance code NCODE<0:N>, based on the second pull-up impedance code NPCODE<0:N>.

The pull-up code generation unit 310 is a unit within the impedance generation circuit which generates the pull-up impedance code PCODE<0:N>. The pull-up code generation unit 310 has a configuration similar to that of the conventional pull-up code generation unit (see FIG. 1). That is, the pull-up code generation unit 310 includes a comparison unit 311, a counter unit 312, and a first pull-up reference impedance unit 313. The comparison unit 311 of the pull-up code generation unit 310 compares the voltage of the calibration node B with the reference voltage VREF. Then, the counter unit 312 counts the comparison result, and generates the pull-up impedance code PCODE<0:N>. The pull-up impedance code PCODE<0:N> is provided to the first pull-up reference impedance unit 313 and the code modification unit 320.

The code modification unit 320 is a newly added feature that generates the second pull-up impedance code NPCODE<0:N> by performing an operation on the first pull-up impedance code PCODE<0:N> using a setting value. The setting value may be a value inputted from an exterior or a value stored in the mode modification unit 320. The term "operation" refers to an addition of the setting value to the first pull-up impedance code PCODE<0:N>, or a subtraction of the setting value from the first pull-up impedance code PCODE<0:N>. Thus, the second pull-up impedance code NPCODE<0:N> may be the result of adding the setting value to the first pull-up impedance code PCODE<0:N> or subtracting the setting value from the first pull-up impedance code PCODE<0:N>. The setting value is a value for correcting the difference between the target impedance value, which is the desired impedance value of the termination circuit of FIG. 2, and the real termination impedance value.

The pull-down code generation unit 330 is a unit within the impedance code generation circuit which generates the pull-down impedance code NCODE<0:N>. The pull-down code generation unit 330 has a configuration similar to that of the conventional pull-down code generation unit (see FIG. 1). That is, the pull-down code generation unit 330 includes a comparison unit 331, a counter unit 332, a second pull-up reference impedance unit 333, and a pull-down reference impedance unit 334. The comparison unit 331 of the pull-down code generation unit 330 compares the voltage of a node A with the reference voltage VREF. Then, the counter unit 332 counts the comparison result, and generates the pull-down impedance code NCODE<0:N>. In the prior art, since the first pull-up impedance code PCODE<0:N> is inputted to the second pull-up reference impedance unit (120 in FIG. 1), the pull-down impedance code NCODE<0:N> is generated based on the first pull-up impedance code PCODE<0:N>. However, in an exemplary embodiment of the present invention, the second pull-up impedance code NPCODE<0:N> is inputted to the second pull-up reference impedance unit 333. Therefore, the pull-down impedance code NCODE<0:N> is generated based on the second pull-up impedance code NPCODE<0:N>. Thus, the pull-down impedance code NCODE<0:N> generated by the pull-down code generation unit 330 becomes a code in which the setting value is reflected.

Figure 4:
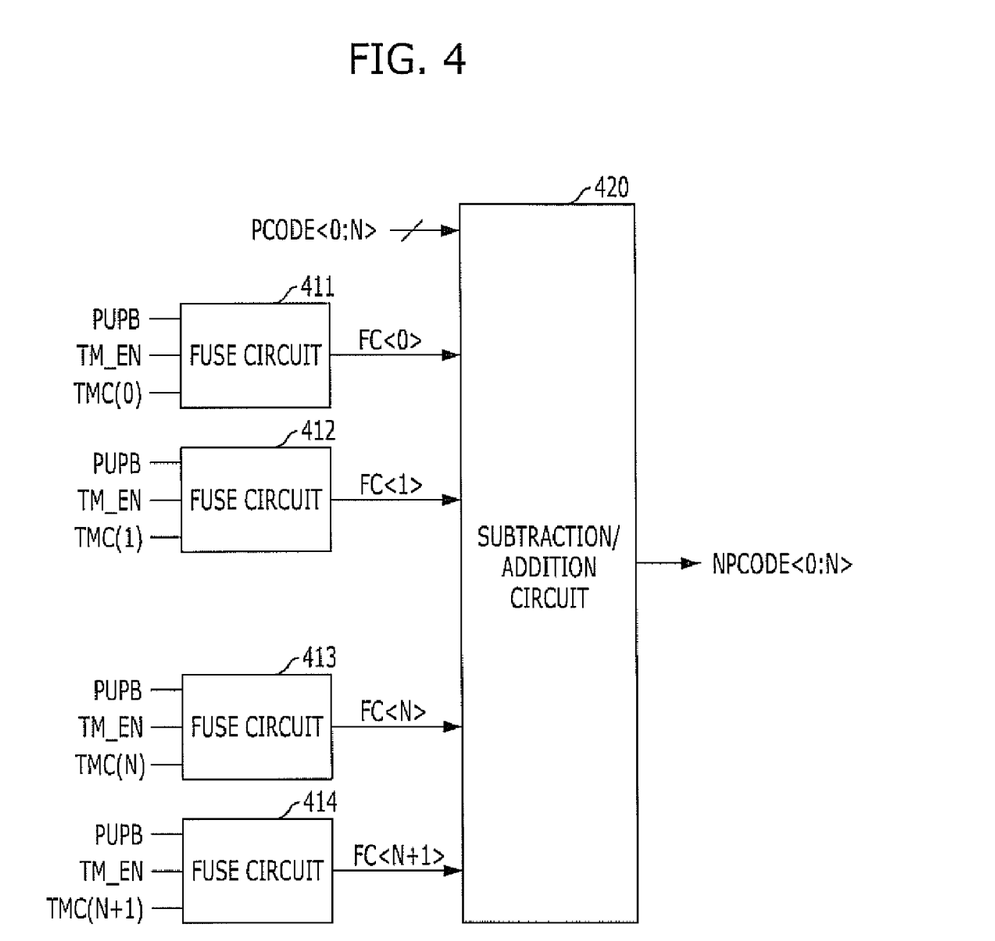
FIG. 4 is a diagram of a code modification unit of FIG. 1.

FIG. 4 is a diagram of the code modification unit 320 illustrated in FIG. 3. Herein, 'N' is any positive integer and is used as an index to refer to a plurality of elements.

Referring to FIG. 4, the code modification unit 320 includes a plurality of fuse circuits and a subtraction/addition circuit 420. Although any number of fuse circuits may be used in the code modification unit 320, FIG. 4 shows an exemplary configuration in which the code modification unit 320 includes four fuse circuits 411 to 414. The plurality of fuse circuits 411 to 414 are configured to store setting values FC<0:N+1>. In FIG. 4, N is equal to 3 because the code modification unit 320 includes four fuse circuits 411 to 414. The subtraction/addition circuit 420 is configured to add or subtract the setting values FC<0:N+1> to or from the first pull-up impedance code PCODE<0:N>, which is also inputted into the subtraction/addition circuit 420.

When a test mode signal TM_EN is inactive (e.g., has a logic low level), the fuse circuits 411 to 414 output the setting values FC<0:N+1> according to whether fuses included in the fuse circuits 411 to 414 are cut or not. When the test mode signal TM_EN is active (e.g., has a logic high level), the fuse circuits 411 to 414 output externally inputted values TMC<0:N+1> as the setting values FC<0:N+1>, respectively.

The subtraction/addition circuit 420 adds or subtracts the setting values FC<0:N> to or from the first pull-up impedance code PCODE<0:N>. The addition or subtraction is determined by the setting value FC<N+1>. For example, when the setting value FC<N+1> is "0", the subtraction/addition circuit 420 operates as an adder which outputs the second pull-up impedance code NPCODE<0:N> by adding the setting values FC<0:N> to the first pull-up impedance code PCODE<0:N>. In this case, when the setting value FC<N+1> is "1", the subtraction/addition circuit 420 operates as a subtractor which outputs the second pull-up impedance code NPCODE<0:N> by subtracting the setting values FC<0:N> from the first pull-up impedance code PCODE<0:N>.

As such, the code modification unit 320 adds or subtracts the setting values FC<0:N> to or from the first pull-up impedance code PCODE<0:N>, and generates the second pull-up impedance code NPCODE<0:N>. As described above, the setting values FC<0:N> may each be a value inputted from the exterior, or a value stored in the fuse circuits 411 to 414.

Figure 5:
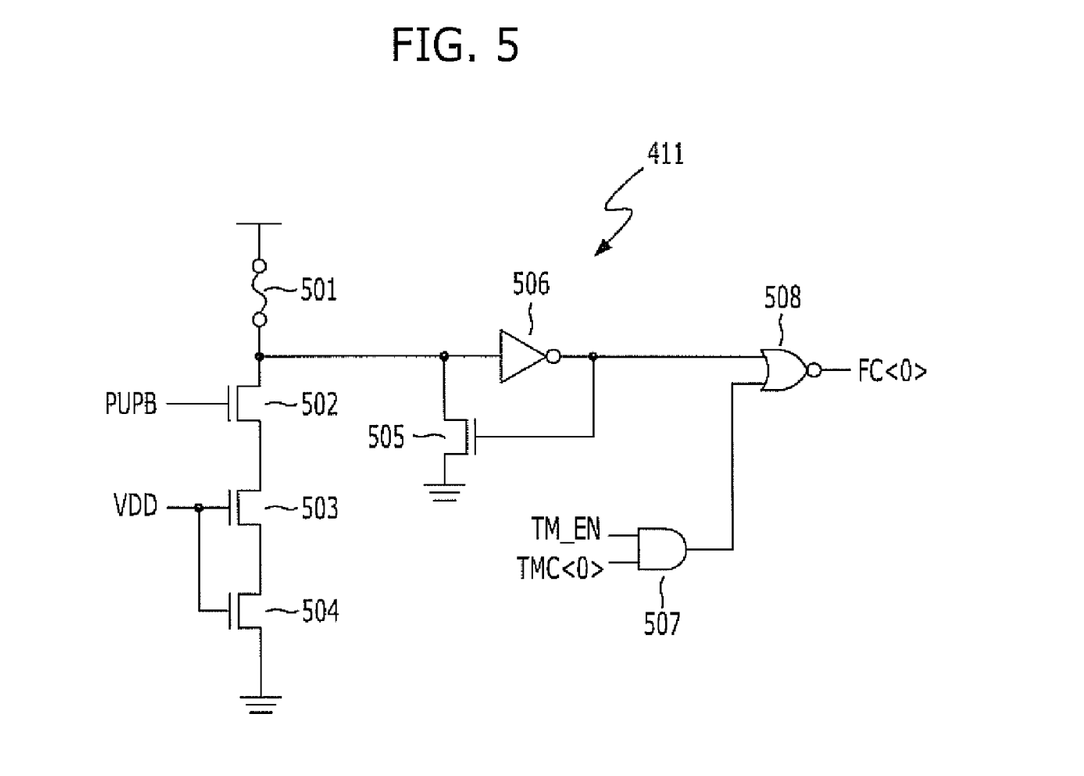
FIG. 5 is a diagram of a fuse circuit.

FIG. 5 is a diagram of a fuse circuit used in the code modification unit 320 of FIG. 4. For convenience, FIG. 5 only illustrates an exemplary configuration of the fuse circuit 411, however, it should be understood that fuse circuits 412 to 414 may have similar configurations.

Referring to FIG. 5, the fuse circuit 411 includes a fuse 501, transistors 502 to 505, an inverter 506, an AND gate 507, and an OR gate 508. When the test mode signal TM_EN is activated to a logic high level, the logic value of the output signal FC<0> is determined by the externally inputted signal TMC<0> (in this case, it is assumed that the fuse 501 is not cut). When the test mode signal TM_EN is deactivated to a logic low level, the logic value of the output signal FC<0> is determined according to whether the fuse 501 is cut or not. A power-up signal PUPB is a signal which maintains a logic low level during a power-up period and changes to a logic high level after the power-up period. Furthermore, a power supply voltage VDD may be a voltage generated within the impedance code generation circuit, or may be supplied from outside the impedance code generation circuit.

Figure 6:
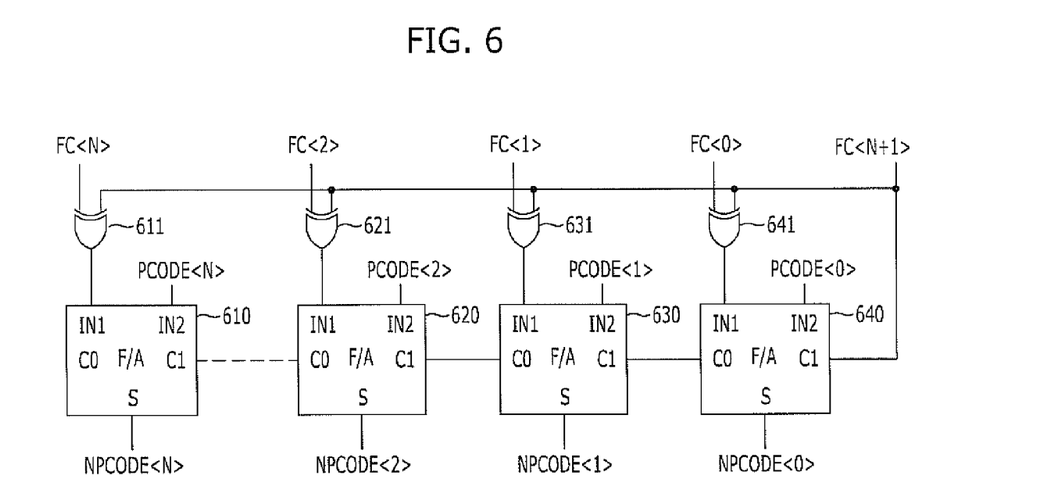
FIG. 6 is a diagram of a subtraction/addition circuit.
Figure 7:
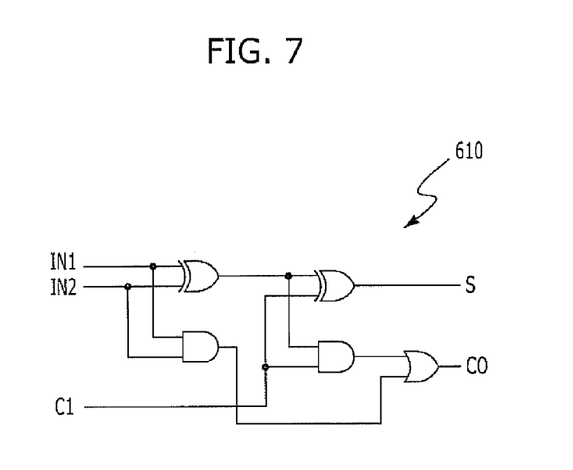
FIG. 7 is a diagram of adders included in the subtraction/addition circuit.

FIG. 6 is a diagram of the subtraction/addition circuit 420, and FIG. 7 is a diagram of an adder included in the subtraction/addition circuit 420. For convenience, FIG. 7 only illustrates the configuration of adder 610 of FIG. 6. It should be understood that other adders of the subtraction/addition circuit 420 may be similarly configured to adder 610.

The adders 610, 620, 630, and 640 may be configured as illustrated in FIG. 7. Referring to FIG. 7, IN1 and IN2 represent input terminals, and CI represents a terminal through which a carry value is inputted. S represents an output terminal, and CO represents a terminal through which the carry value is outputted. The subtraction/addition circuit 420 operates in accordance with the truth table of Table 1 below.

TABLE 1

| CI | IN1 | IN2 | S | CO |
|----|-----|-----|---|----|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

Since the internal configuration of the adders 610, 620, 630, and 640 is known to those skilled in the art, a detailed description thereof is omitted.

Referring to FIG. 6, the subtraction/addition circuit 420 includes the plurality of adders 610, 620, 630, and 640 and XOR gates 611, 621, 631, and 641. The XOR gates 611, 621, 631, and 641 each perform an XOR operation on one of the setting values FC<0:N> and the setting value FC<N+1>. As shown in FIG. 6, the adders 610, 620, 630, and 640 each receive a part of the first pull-up impedance code PCODE<0:N> and an output from one of the XOR gates 611, 621, 631, and 641. Hereinafter, an exemplary operation of the subtraction/addition circuit 420 is described.

When the setting value FC<N+1> is, for example, "0", the subtraction/addition circuit 420 outputs the second pull-up impedance code NPCODE<0:N> by performing an addition operation on the first pull-up impedance code PCODE<0:N> and the setting values FC<0:N>. In this case, when the setting value FC<N+1> is "1", the complementary values (e.g., inverted logic levels) of the setting values FC<0:N> is inputted to the terminals IN1 of the adders 610, 620, 630 and 640. As a result, the values obtained when the setting values FC<0:N> are subtracted from the first pull-up impedance code PCODE<0:N> is outputted as the second pull-up impedance code NPCODE<0:N>.

Figure 8:
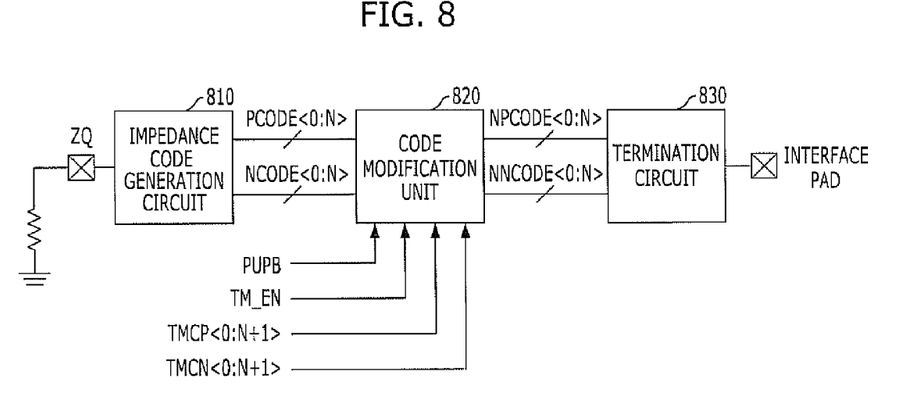
FIG. 8 is a diagram of a semiconductor device in accordance with another exemplary embodiment of the present invention.

FIG. 8 is a diagram of a semiconductor device in accordance with another exemplary embodiment of the present invention.

In the exemplary embodiment of FIG. 3, a case in which the code modification unit 320 is provided inside the impedance code generation unit is illustrated. In contrast, in the exemplary embodiment of FIG. 8, a case in which the code modification unit 820 is provided outside the impedance code generation circuit 810 is illustrated.

Referring to FIG. 8, the semiconductor device includes an impedance code generation circuit 810, a code modification unit 820, and a termination circuit 830. The impedance code generation circuit 810 is configured to generate impedance codes PCODE<0:N> and NCODE<0:N>. The code modification unit 820 is configured to generate modified impedance codes NPCODE<0:N+1> and NNCODE<0:N> by performing an operation on the impedance codes PCODE<0:N> and NCODE<0:N> in response to externally inputted information (e.g., TMC<0:N>, TM_EN, and PUPB). The termination circuit 830 is configured to terminate an interface node (a node coupled to an interface pad) by using the impedance value determined by the modified impedance codes NPCODE<0:N> and NNCODE<0:N>.

The impedance code generation circuit 810 generates the impedance codes PCODE<0:N> and NCODE<0:N>. The impedance code generation circuit 810 may be configured as illustrated in FIG. 1, or may be modified in various manners as long as it generates the impedance codes PCODE<0:N> and NCODE<0:N>.

The code modification unit 820 generates the modified impedance codes NPCODE<0:N> and NNCODE<0:N> by performing an operation on the impedance codes PCODE<0:N> and NCODE<0:N> generated by the impedance code generation circuit 810 according to a setting value. The setting value may be determined by externally inputted signals TMCP<0:N+1> and TMCN<0:N+1>, or values stored in the code modification unit 820. The setting value for modifying the impedance code PCODE<0:N> and the setting value for modifying the impedance code NCODE<0:N> may be separate values.

The code modification unit 820 may have a configuration substantially identical to that of FIG. 4. The code modification unit 320 of FIG. 4 has a configuration which modifies one code PCODE<0:N>, while the code modification unit 820 of FIG. 8 has a configuration which modifies two codes PCODE<0:N> and NCODE<0:N>>. Thus, the code modification unit 820 of FIG. 8 has a configuration which includes two code modification units as configured in FIG. 4. Since such a modification may be easily carried out by those skilled in the art, a detailed description thereof is omitted.

The termination circuit 830 terminates the interface node (coupled to the interface pad) by using the modified impedance codes NPCODE<0:N> and NNCODE<0:N>. The termination circuit 830 may have the same configuration as that of the conventional termination circuit of FIG. 2, except that the termination circuit 830 receives the modified impedance codes NPCODE<0:N> and NNCODE<0:N> instead of the impedance codes PCODE<0:N> and NCODE<0:N>.

Referring to FIG. 8, the impedance codes PCODE<0:N> and NCODE<0:N> generated by the impedance code generation circuit 810 are corrected to suitable values by the code modification unit 820. As a result, the modified impedance codes NPCODE<0:N> and NNCODE<0:N> are inputted to the termination circuit 830 and used to determine the impedance value of the termination circuit 830. Therefore, it is possible to match the impedance of the termination circuit 830 with the impedance of an external circuit.

Although two impedance codes PCODE<0:N> and NCODE<0:N> are used in FIG. 8, the semiconductor device can also use only one impedance code PCODE<0:N> or NCODE<0:N>. This is because the interface node may be terminated only in the pull-up direction or the pull-down direction according to the termination scheme of the semiconductor device. Therefore, the semiconductor device may be configured so that the impedance code generation circuit 810 generates one impedance code PCODE<0:N> or NCODE<0:N>, the code modification unit 820 modifies the code value of one impedance code PCODE<0:N> or NCODE<0:N>, and the termination circuit 830 receives one modified impedance code NPCODE<0:N> or NNCODE<0:N> and terminates the interface node (coupled to the interface pad) in either the pull-up direction or the pull-down direction.

Hereinafter, a method for effectively setting a termination impedance value by using the configuration of the impedance code generation circuit and the semiconductor device in accordance with exemplary embodiments of the present invention is described.

First, in such a state that a setting value is not set, the impedance codes PCODE<0:N> and NCODE<0:N> are generated by the impedance code generation circuit 810, and the termination circuit 830 terminates the interface node (coupled to the interface pad) according to the generated impedance codes PCODE<0:N> and NCODE<0:N>. In this state, it is determined whether the current impedance matching is correct or not by measuring the characteristic (e.g., impedance) of the interface node (coupled to the interface pad). A difference between the target termination impedance value and the current termination impedance value is checked.

Then, values TMCP<0:N+1> and TMCN<0:N+1> are inputted from the exterior to the semiconductor device according to the measured characteristic of the interface node (coupled to the interface pad). The impedance codes PCODE<0:N> and NCODE<0:N> are modified according to the values TMCP<0:N+1> and TMCN<0:N+1> to generate modified impedance codes NPCODE<0:N> and NNCODE<0:N>, which are supplied to the termination circuit 830, instead of the existing impedance codes PCODE<0:N> and NCODE<0:N>. After the termination circuit 830 terminates the interface node (coupled to the interface pad) according to the modified impedance codes NPCODE<0:N> and NNCODE<0:N>, the characteristic of the interface node (coupled to the interface pad) is again measured. The process may be repeated depending on the measurement. If the measurement indicates that the impedance of the interface node is matched, the values TMCP<0:N+1> and TMCN<0:N+1> inputted from the outside of the semiconductor device are the correct values. Therefore, values equivalent to the externally inputted values TMCP<0:N+1> and TMCN<0:N+1> may be programmed in the fuse circuit included in the code modification unit 820. When the fuse circuit is programmed (i.e., selectively cutting fuses), setting values FC<0:N+1> are stored. Thereafter, the modified impedance codes NPCODE<0:N> and NNCODE<0:N> are automatically inputted to the termination circuit 830 according to the setting values FC<0:N+1>, even though the values TMCP<0:N+1> and TMCN<0:N+1> are not inputted from the exterior.

The above-described method is merely one example which utilizes the configuration of FIG. 8. It should be understood that the invention is not limited to the utilization of the configurations described with reference to FIGS. 4 to 8.

In accordance with exemplary embodiments of the present invention, the impedance codes may be subtracted or added according to values inputted from the outside of the semiconductor device or values stored in the fuse circuit. Therefore, the termination impedance value may be corrected when the termination impedance value is different from the target value.

While the present invention has been described with respect to the specific embodiments, it will be apparent to those skilled in the art that various changes and modifications may be made without departing from the spirit and scope of the invention as defined in the following claims.

What is claimed is:

1. An impedance code generation circuit comprising:
   a pull-up code generation unit configured to compare a voltage of a calibration node with a reference voltage and generate a first pull-up impedance code;
   a code modification unit configured to generate a second pull-up impedance code by performing an operation on the first pull-up impedance code according to a setting value; and
   a pull-down code generation unit configured to generate a pull-down impedance code based on the second pull-up impedance code.
   wherein the code modification unit generates the second pull-up impedance code by adding or subtracting the setting value to or from the first pull-up impedance code.

2. The impedance code generation circuit of claim 1, wherein the code modification unit comprises:
   at least one fuse circuit configured to store the setting value; and
   a subtraction/addition circuit configured to add or subtract the setting value to or from the first pull-up impedance code.

3. The impedance code generation circuit of claim 2, wherein the at least one fuse circuit outputs the setting value according to whether the fuse is cut or not when a test mode signal is activated, and the at least one fuse circuit outputs the setting value according to an externally inputted signal when the test mode signal is deactivated.

4. The impedance code generation circuit of claim 2, wherein the code modification unit further comprises an additional fuse circuit that stores a signal which determines whether to perform an addition operation or a subtraction operation of the subtraction/addition circuit.

5. The impedance code generation circuit of claim 2, wherein the setting value comprises a number of values that is greater than or equal to a number of values within the first pull-up impedance code.

6. The impedance code generation circuit of claim 2, wherein a number of fuse circuits of the code modification unit is equal to the number of values of the setting value.

7. The impedance code generation circuit of claim 2, wherein the subtraction/addition circuit comprises at least one XOR gate and at least one adder.

8. The impedance code generation circuit of claim 7, wherein a number of adders corresponds to a number of values within the first pull-up impedance code.

* * * * *